(12) United States Patent
Cherubini et al.

(10) Patent No.: US 9,251,827 B2
(45) Date of Patent: Feb. 2, 2016

(54) SERVO PATTERN OF A TAPE STORAGE MEDIUM

(71) Applicant: International Business Machines Corporation, Armonk, NY (US)

(72) Inventors: Giovanni Cherubini, Rueschlikon (CH); Johan B. C. Engelen, Zurich (CH); Simeon Furrer, Altdorf (CH); Jens Jelitto, Rueschlikon (CH); Mark A. Lantz, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/646,084

(22) PCT Filed: Nov. 27, 2013

(86) PCT No.: PCT/IB2013/060436
§ 371 (c)(1),
(2) Date: May 20, 2015

(87) PCT Pub. No.: WO2014/083508
PCT Pub. Date: Jun. 5, 2014

(65) Prior Publication Data
US 2015/0318006 A1  Nov. 5, 2015

(30) Foreign Application Priority Data

Nov. 30, 2012  (GB) .................................. 1221556.2

(51) Int. Cl.
*G11B 5/09* (2006.01)
*G11B 5/584* (2006.01)
(52) U.S. Cl.
CPC ...................................... *G11B 5/584* (2013.01)

(58) Field of Classification Search
None
See application file for complete search history.

(56) References Cited

U.S. PATENT DOCUMENTS 6,873,487 B2   3/2005   Molstad
6,961,203 B1  11/2005   Baker
(Continued)

FOREIGN PATENT DOCUMENTS

GB        2508388 A     6/2014
JP     2009093739 A     4/2009
WO    2014083508 A3     6/2014

OTHER PUBLICATIONS

Patents Act 1977: Search Report under Section 17(5), Intellectual Property Office, your reference CH920120053GB1, Application No. GB1221556.2, dated Mar. 25, 2013, pp. 1-4.
(Continued)

*Primary Examiner* — K. Wong
(74) *Attorney, Agent, or Firm* — Olivia R. Scheuer

(57) ABSTRACT

A tape storage medium comprises at least one servo band along a longitudinal extension of the tape storage medium for comprising positional information. The servo band comprises a first servo subband and a second servo subband extending along the longitudinal extension of the tape storage medium. The first servo subband comprises a frame servo pattern containing a first set of servo frames, wherein each servo frame of the set comprises a first burst and a second burst. Each burst comprises at least two servo stripes inclined at an angle with respect to a direction orthogonal to the longitudinal extension of the tape medium. The second servo subband contains a set of servo tracks extending along the longitudinal extension of the tape storage medium and arranged next to each other, wherein each servo track of the set contains a servo pattern of magnetic transitions.

20 Claims, 8 Drawing Sheets

(56) References Cited

U.S. PATENT DOCUMENTS

| | | | |
|---|---|---|---|
| 7,529,061 B2 * | 5/2009 | Bui | G11B 5/584 360/77.12 |
| 7,742,254 B2 | 6/2010 | Cherubini et al. | |
| 2005/0117246 A1 | 6/2005 | Sueki et al. | |
| 2005/0117493 A1 | 6/2005 | Sueki et al. | |
| 2005/0254156 A1 | 11/2005 | Bandic et al. | |
| 2006/0126207 A1 | 6/2006 | Johnson et al. | |
| 2007/0047131 A1 | 3/2007 | Berman et al. | |
| 2008/0049356 A1 | 2/2008 | Weber et al. | |
| 2009/0109563 A1 | 4/2009 | Handa et al. | |
| 2009/0316296 A1 | 12/2009 | Cherubini et al. | |
| 2010/0123972 A1 | 5/2010 | Higashino | |

OTHER PUBLICATIONS

Patent Cooperation Treaty, PCT, Notfication of Transmittal of the International Search Report and the Written Opinion of the International Searching Authority, or the Declaration, Applicant's File Reference CH920120053PCT1, date of mailing May 27, 2014, International application No. PCT/IB2013/060436, International filing date: Nov. 27, 2013, pp. 1-10.

* cited by examiner

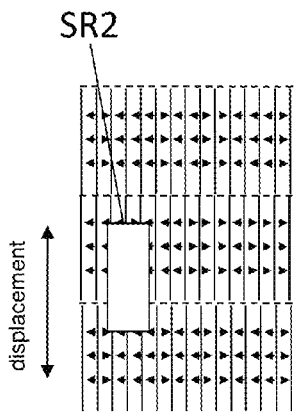 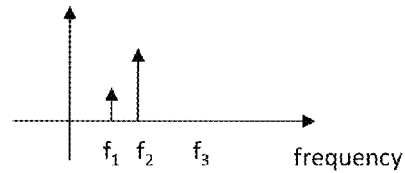
FIG. 6A  FIG. 6B
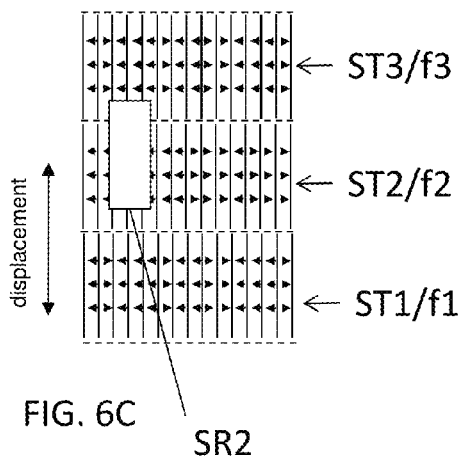 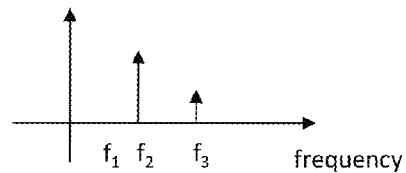
FIG. 6C  FIG. 6D
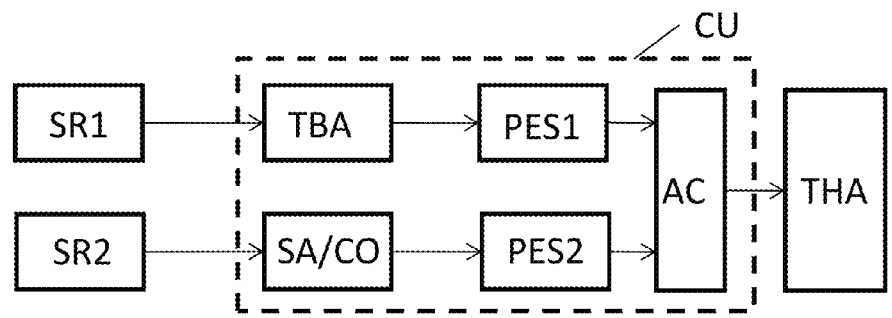
FIG. 12

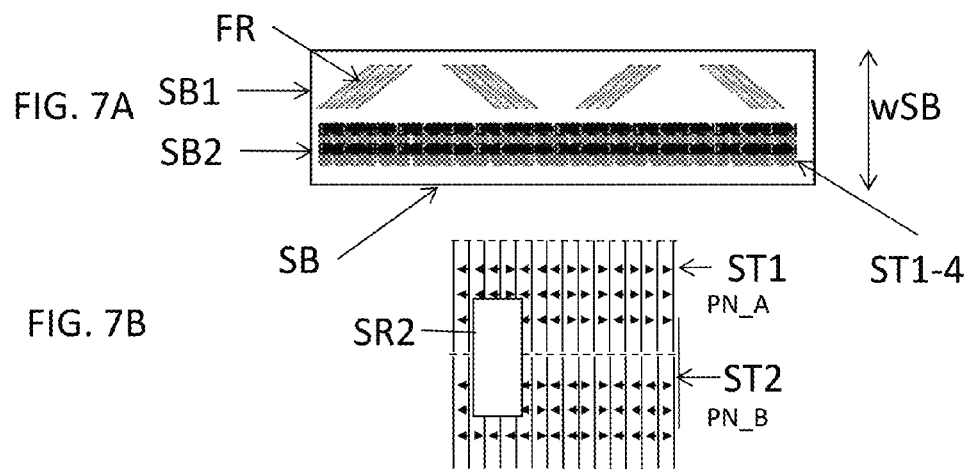
FIG. 7A
FIG. 7B
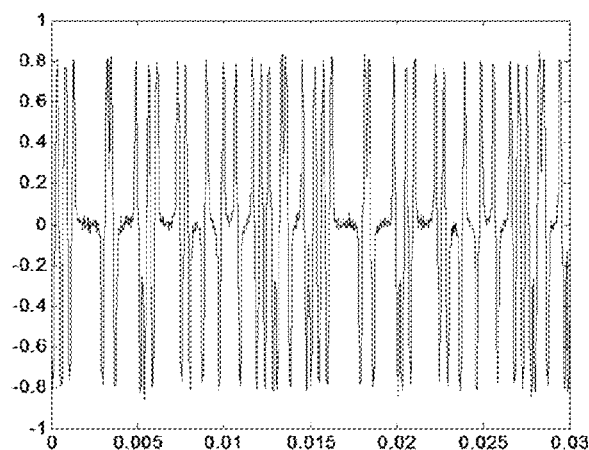
FIG. 7C
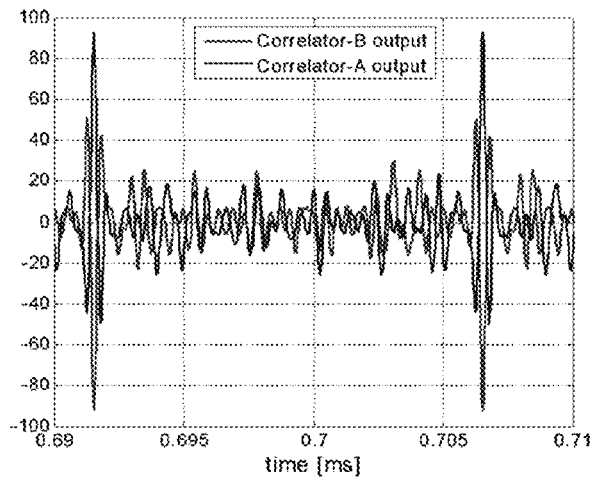
FIG. 7D

SERVO PATTERN OF A TAPE STORAGE MEDIUM

BACKGROUND OF THE INVENTION

The present invention relates generally to the field of tape storage medium, and more particularly to the servo pattern of a tape storage medium.

Tape storage media typically comprise servo information prerecorded in one or more dedicated servo bands that extend next to data bands for storing data. Servo bands extend in a longitudinal direction along the tape medium. A servo band typically is read by a dedicated servo reader of a tape head of a tape drive. A cartridge containing the tape storage medium is inserted into the tape drive. The read servo information allows for determining a lateral deviation of the tape storage medium from a reference position, which reference position is desired for correctly reading data from and writing data to the tape storage medium by dedicated data readers and writers of the tape head. A position error signal representing the lateral deviation will be translated into a control signal for an actuator for controlling a lateral position of the tape head with respect to the tape medium.

SUMMARY

According to an embodiment of the first aspect of the present invention, a tape storage medium is provided comprising at least one servo band along a longitudinal extension of the tape storage medium for wherein the at least one servo band comprises positional information. The servo band further comprises a first servo subband extending along the longitudinal extension of the tape storage medium comprising: a first frame servo pattern containing a first set of servo frames. Each servo frame of the set comprises: a first burst comprising at least one servo stripe inclined at a first angle with respect to a direction orthogonal to the longitudinal extension of the tape storage medium, followed by a second burst comprising at least one servo stripe inclined at a second angle with respect to the direction orthogonal to the longitudinal extension of the tape storage medium, which second angle is different from the first angle. A second servo subband is provided extending along the longitudinal extension of the tape storage medium next to the first servo subband. The second servo subband comprises a set of servo tracks extending along the longitudinal extension of the tape storage medium and arranged next to each other. Each servo track of the set contains a servo pattern representing a waveform when being read. The waveforms of adjacent servo tracks are orthogonal to each other.

According to an embodiment of another aspect of the present invention, a method is provided for operating a tape drive for reading and/or writing data from/to a tape storage medium. The first servo subband is read by a first servo reader. A first lateral position value of a tape head containing the first servo reader relative to the tape storage medium is determined from a readback signal of the first servo reader. A lateral position of the tape head is adjusted dependent on the first lateral position value. The second servo subband is read by a second servo reader. A second lateral position value of the tape head containing the second servo reader relative to the tape storage medium is determined from a readback signal of the second servo reader. A lateral position of the tape head is adjusted dependent on the second lateral position value.

According to an embodiment of a further aspect of the present invention, a computer program product is provided comprising a computer readable medium having computer readable program code embodied therewith, the computer readable program code comprising computer readable program code configured to perform program instructions to read a first servo subband by a first servo reader; program instructions to determine a first lateral position value of a tape head comprising the first servo reader relative to a tape storage medium from a readback signal of the first servo reader and adjusting a lateral position of the tape head dependent on the first lateral position value; program instructions to read a second servo subband by a second servo reader; and program instructions to determine a second lateral position value of the tape head comprising the second servo reader relative to the tape storage medium from a readback signal of the second servo reader and adjusting the lateral position of the tape head dependent on the second lateral position value.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating:

FIG. 6 illustrates a portion of a servo band of a tape storage medium according to another embodiment of the present invention, and related diagrams, FIGS. 7A-D illustrate a portion of a servo band of a tape storage medium and graphs according to a further embodiment of the present invention, and related diagrams, FIG. 12 illustrates a block diagram of selected items of a tape drive according to an embodiment of the present invention.

DETAILED DESCRIPTION

Figure 1:
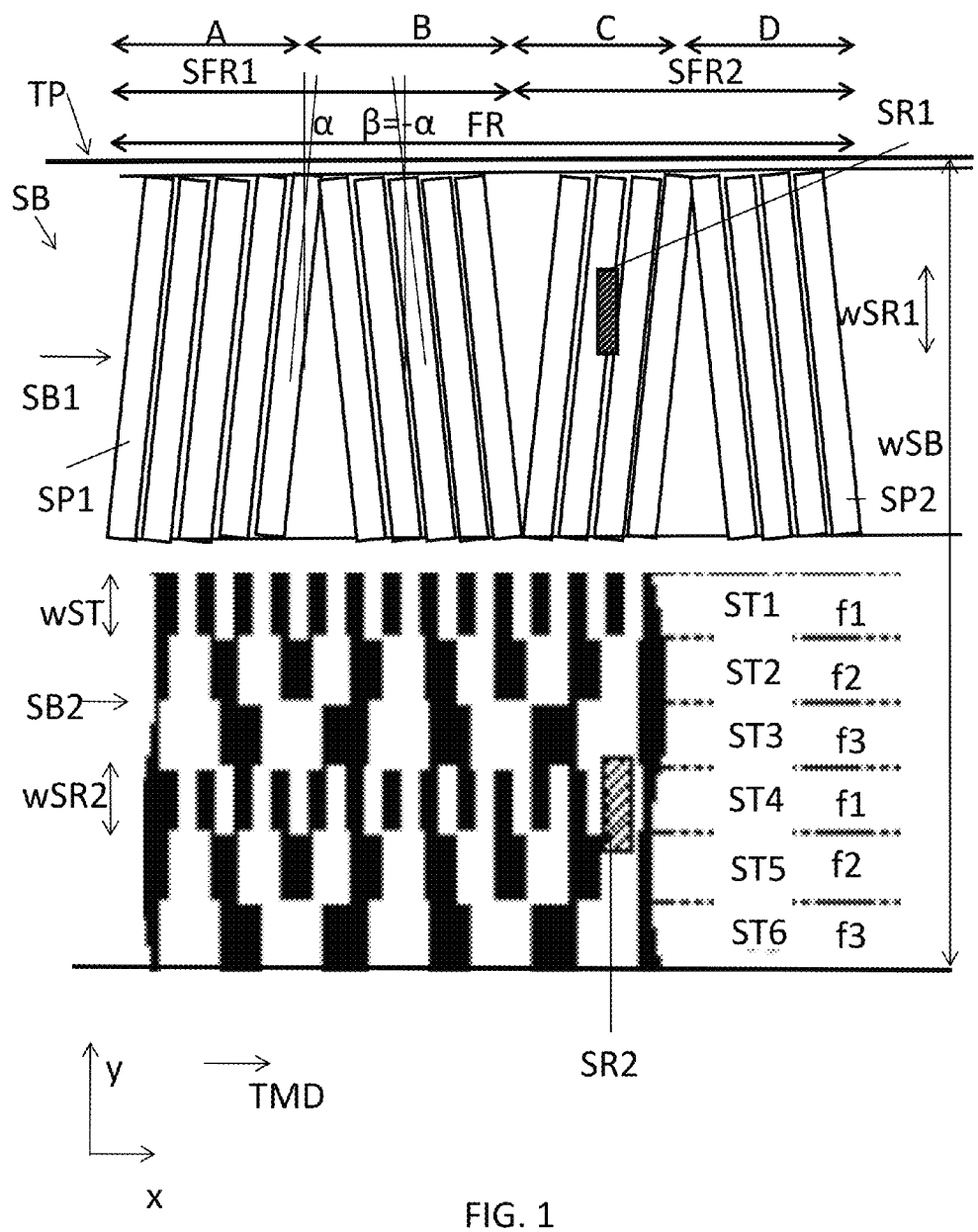
FIG. 1 illustrates a portion of a servo band of a tape storage medium according to an embodiment of the present invention.

In embodiments of the present invention, the tape storage medium may comprise one or more of the following features: the servo pattern of each servo track of the set contains magnetic transitions at a defined frequency, and the frequencies of magnetic transitions of servo patterns of adjacent servo tracks are different from each other; a lowest frequency of magnetic transitions in any of the servo tracks of the set is more than a repetition frequency of the servo frames in the first subband; a lowest frequency of magnetic transitions in any of the servo tracks of the set is more than twice the repetition frequency of the servo frames in the first subband; a lowest frequency of magnetic transitions in any of the servo tracks of the set is more than ten times the repetition frequency of the servo frames in the first subband; the servo pattern of each servo track of the set contains a pseudo noise sequence of symbols, and the pseudo noise sequences of servo patterns of adjacent servo tracks are different from each other; a length of the pseudo noise sequence in the servo tracks is less than a length of the servo frame in the first servo subband; a length of the pseudo noise sequence in the servo tracks is less than half the length of the servo frame in the first servo subband; a length of the pseudo noise sequence in the servo tracks is less than a tenth of the length of the servo frame in the first servo subband; the servo pattern of each servo track of the set is a frameless continuous servo pattern along the longitudinal extension of the tape storage medium; the servo band comprises a third servo subband extending along the longitudinal extension of the tape storage medium containing a further frame servo pattern containing a further set of servo frames; the further frame servo pattern of the third servo subband is identical to the frame servo pattern of the first servo subband, and the third servo subband is arranged next to the second servo subband.

According to an embodiment of another aspect of the present invention, a tape drive is provided for reading and/or writing data to/from a tape storage medium, to a tape storage medium according to any one of the preceding embodiments. The tape drive comprises a tape head containing at least a first servo reader assigned for reading from the servo band, and a second servo reader assigned for reading from the servo band.

In some embodiments, the tape drive may comprise one or more of the following features: the first servo reader and the second servo reader are arranged adjacent to each other and orthogonal to the longitudinal extension of the tape storage medium when arranged in the tape drive; the first servo reader and the second servo reader are mechanically coupled at a fixed distance from each other; a width of the second servo reader orthogonal to the longitudinal extension of the tape storage medium is at least a width of a servo track in the second servo subband orthogonal to the longitudinal extension of the tape storage medium when arranged in the tape drive; the width of the second servo reader is equal to the width of the first servo reader; the tape head contains a third servo reader assigned for reading from the servo band and arranged adjacent to the second servo reader orthogonal to the longitudinal extension of the tape storage medium when arranged in the tape drive.

In some embodiments, a method for the present invention may comprise one or more of the following features: reading the first servo subband and the second servo subband simultaneously; determining the first lateral position value at a repetition frequency of the servo frames in the first servo subband and adjusting the lateral position of the tape head at the repetition frequency; determining the second lateral position value at a second frequency exceeding the repetition frequency and adjusting the lateral position of the tape head at the second frequency; determining the second lateral position value includes identifying one or more waveforms in the readback signal of the servo reader.

It is understood that method steps may be executed in a different order than listed in a method claim. Such different order shall also be included in the scope of such claim as is the order of steps as presently listed. Embodiments described in relation to the aspect of write head shall also be considered as embodiments disclosed in connection with any of the other categories such as the method.

As an introduction to the following description, it is first pointed at a general aspect of the invention concerning a tape storage medium, a tape drive, and a method for operating a tape storage medium.

A tape storage medium for storing data—also abbreviated as tape —, and in particular a magnetic tape storage medium may be arranged in a cartridge which the cartridge may be inserted into a tape drive for reading data from the tape storage medium and writing data to the storage tape medium. The tape storage medium has a longitudinal extension and a width orthogonal to its longitudinal extension. The tape is wound onto one or more reels which are driven by the tape drive in order to make the tape pass by data readers and writers of a tape head for reading and/or writing data from and/or to the tape storage medium. The tape storage medium typically is preformatted with servo information. This servo information in the form of servo patterns enables a servo reader of the tape head, during reading and/or writing data, to pick up servo information as to a lateral position of the tape head with respect to the tape storage medium, which lateral position is a position orthogonal to the longitudinal extension of the magnetic tape storage medium. Such position information may be converted into a control signal for the tape head to laterally readjust in case a deviation from a lateral reference position is detected which lateral reference position is desired to be maintained by the tape head for correctly reading data from and writing data to the tape by the dedicated data readers and writers. The deviation signal, also denoted as position error signal (PES), is typically supplied by a servo channel processing a readback signal from the dedicated servo reader of the tape head and may be translated into a control signal for an actuator for controlling the lateral position of the tape head with respect to the tape. Given that in one embodiment the servo reader and the data readers and writers are mechanically coupled and can commonly be actuated by the actuator, a rapid correction of the tape head deviation may be achieved during reading and/or writing data from and/or to the tape. It is understood, that the term tape head may also refer to a tape head module into which one or more servo readers and data readers and/or writers are mechanically coupled while at the same time there may be additional tape head modules containing other servo readers and data readers and/or writers are mechanically coupled which tape head modules may individually be controllable in their lateral position.

The servo patterns typically are preformatted, e.g. by the tape manufacturer, on dedicated areas of the tape, also denoted as servo bands extending along the longitudinal extension of the tape. The one or more servo bands extend next to data bands for storing data. Each data band may contain multiple data tracks, wherein each data track is provided for sequentially storing data. Servo information may take a shape different from data.

In an embodiment, the tape storage medium comprises at least one servo band which servo band contains a first servo subband extending along the longitudinal extension of the tape storage medium, and at least a second subband extending along the longitudinal extension of the tape storage medium next to the first subband. In case of multiple servo bands, it is preferred that each servo band contains the structure of at least a first subband and a second subband containing the different servo patterns as will be described in the following. In particular, each servo band may then contain the identical servo information in the respective subbands except for servo band or servo track specific information such as the servo band identifier if any.

In some embodiments, the first subband contains a first servo pattern organized in servo frames for supporting to determine positional information. A servo frame contains at least a first burst comprising at least one servo stripe inclined at a first angle with respect to a direction orthogonal to the longitudinal extension of the tape medium, followed by a second burst comprising at least one servo stripe inclined at a second angle with respect to the direction orthogonal to the longitudinal extension of the tape medium, which second angle is different from the first angle.

Such servo pattern is also denoted as timing-based servo (TBS) pattern. TBS is a technology developed specifically for linear tape drives in the late '90s. In TBS systems, recorded servo patterns comprise transitions with at least two different azimuthal slopes. The tape head lateral position may be derived from the relative timing of pulses generated by a servo reader reading the servo pattern. TBS was adopted by the linear tape open (LTO) consortium, and a complete format for LTO tape drives of the first generation was standardized by the European Computer Manufacturers Association (ECMA) in 2001 as ECMA-319. The servo patterns in LTO are written on five dedicated servo bands that straddle four data bands.

Hence, in the first subband, the servo information is a frame servo pattern organized in multiple servo frames. A servo frame may, for example, be considered as a unit containing servo information according to a specific arrangement, and the information contained in such servo frame may only be available after the complete servo frame is read. Hence, a lateral position value, also denoted as first lateral position value in the following, may only be determined from the frame servo pattern at a repetition frequency of the servo frames in the first servo subband and the lateral position of the tape head may at maximum be adjusted at the repetition frequency.

In an embodiment, a servo frame, and preferably each servo frame of the first servo subband may contain multiple bursts. In some embodiments, each burst includes a sub-pattern which in the present embodiment is defined by an orientation of multiple stripes arranged in parallel to each other. When two bursts with stripes of different orientation are arranged next to each other in tape motion direction, a servo reader may derive from a time period between two pulses in the readback signal originating from stripe in these different bursts a lateral position of the servo reader with respect to the tape storage medium. Hence, for any lateral position of the servo reader on the frame servo pattern, the pulses in the servo readback signal show up at different times and hence allow for a determination of the lateral position.

However, the above timing between pulses in the readback signal also depends on a velocity of the tape. In particular, when there is at least one more burst provided with stripes inclined in the same orientation as the stripes of one of the first two bursts, a tape velocity can be estimated from a timing of pulses in the readback signal originating from these bursts with stripes inclined in the same direction. Hence, by measuring a time difference between pairs of stripes with identical azimuthal angle, and by measuring a time difference between pairs of stripes with opposite azimuthal angles, the lateral position of the tape head can be estimated. In cases where a deviation between the tape head and the tape is determined, a control unit may, in a closed-loop control, control an actuator of the tape head and laterally reposition the tape head such that the tape head is laterally realigned with the tape. However, given that a new lateral position value can only be determined after an entire frame being read, a rate of such parameter update is limited by the length of the servo frames together with the tape velocity.

For this reason, the second servo subband preferably contains a different servo pattern allowing for an update of the lateral position at a frequency, also denoted as second frequency, which is higher than the repetition frequency. For this purpose, multiple servo tracks extend along a longitudinal extension of the servo band, i.e. along a longitudinal extension of the tape storage medium. Such multiple servo tracks may contain different servo patterns which allow for a precise position control. In one embodiment, the servo band may contain at least two servo tracks adjacent to each other. In some embodiments, the servo tracks adjacent to each other contain different servo patterns. Given that the tape storage medium typically is a magnetic storage medium, the servo pattern in each servo track is represented by magnetic transitions along the servo track. Such magnetic transitions represent a waveform in a readback signal of an assigned servo reader when such servo pattern would individually be read. In this context it is emphasized, that the waveform resulting from a servo pattern in an individual servo track shall encompass a representation of the subject signal in both, the time domain and the frequency domain.

In case such second servo subband is read by a servo reader with a width being at least the width of an individual servo track in this second subband—and preferably less than an accumulation of the widths of all servo tracks—such servo reader may either provide a readback signal with a single waveform originating from a single track only in case the servo reader is exactly positioned over the center of one of the tracks and as such exclusively covers this track and provided its width is equal to the width of a servo track, or provide a readback signal containing two or more different waveforms originating from two or more tracks when the servo reader covers these two or more servo tracks at least to some extent, which may be the case when its width is equal to the width of a servo track and is the case when its width is more than the width of a servo track. The subject waveforms then overlap, i.e., are added in the readback signal of the servo reader and, in other words, the readback signal of the servo reader may be composed of two or more overlying different waveforms stemming from magnetic transitions of adjacent servo tracks the servo reader currently scans. For allowing to determine which waveforms are present in a readback signal of the servo reader, it is preferred that the waveforms of adjacent servo tracks are orthogonal to each other. This means, that the waveforms and hence the underlying servo patterns in at least two adjacent servo tracks are distinguishable when being present in a common signal or channel at least in one of the time domain or the spectral domain, such that by applying an appropriate analysis in either of the domains, the waveforms contained in the readback signal can be identified.

In case there are more than two different waveforms used in the servo tracks, it is preferred that each waveform is orthogonal to each of the other waveforms used.

Orthogonality in multichannel signal transmission preferably is fulfilled if a product of the spectrum or a correlation of the time function of the subject waveform with a waveform in an adjacent track is zero. This means, that a cross-correlation between any two different waveforms preferably is zero either in the time domain or in the spectral domain for all different waveforms applied, such that the waveforms used in the different servo tracks, and hence their underlying magnetic transition schemes defining the different servo patterns, are orthogonal.

In one embodiment, the waveforms represented by the underlying servo patterns of different servo tracks are characterized in the spectral domain by different defined frequencies of magnetic transitions in the subject servo track. Specifically, a waveform with a defined frequency in the spectral domain is a periodic waveform in the time domain, and preferably a sinusoidal waveform in the time domain. Those waveforms are orthogonal in the spectral domain, which qualifies them as suitable waveforms. The readback signal of the servo reader is analyzed in the spectral domain. The underlying servo patterns arranged in the different servo tracks may belong to a class of energy based servo (EBS) patterns. If such servo patterns of multiple servo tracks are read by a single servo reader covering multiple servo tracks while reading, the readback signal from the servo reader provides different energies at different frequencies subject to the coverage of the different servo tracks. By means of evaluating the energies in the readback signal at the various frequencies and specifically by building ratios between the various energies, a lateral position of the servo reader can be determined with respect to the tape. In case a data reader for reading data and a data writer for writing data are mechanically coupled with the subject servo reader, any lateral deviation of the subject servo reader detected by reading the second servo subband also is valid for the data reader and the data writer. Hence, any lateral actuation of the tape head including the subject servo reader, the data reader and the data writer may correct for the detected deviation and bring the data reader and the data writer back on their desired lateral positions.

Whenever a lowest frequency of magnetic transitions in any of the servo tracks of the set of servo tracks is more than the repetition frequency of the servo frames in the first subband, the second servo subband allows for a more frequent update rate of the lateral position of the tape head at a second frequency that exceeds the repetition frequency. In some embodiments, a ratio of the second frequency and the repetition frequency may exceed ten.

In another embodiment, the waveforms represented by the underlying servo patterns of different servo tracks are characterized in the time domain by different bit patterns with good cross-correlation properties, e.g., pseudo-noise sequences or Gold sequences. This means, that those waveforms can be viewed as orthogonal in the time domain, which qualifies them as suitable waveforms where the readback signal of the servo reader is analyzed in the time domain, for example, by correlating the readback signal with the different waveforms applied. In this embodiment, the servo patterns in the various servo tracks are pseudo noise sequences also denoted as pseudo noise bit patterns. In some embodiments, a single pseudo noise sequence repeats along the longitudinal extension of the servo track, and pseudo noise sequences of adjacent servo tracks are orthogonal to each other such that their contributions to a readback signal can reliably be detected. It is preferred that, for this purpose, the pseudo noise sequences of adjacent servo tracks are written with a well-determined phase relationship. By means of evaluating correlation results of the readback signal with the individual pseudo noise sequences applied, the pseudo noise sequences present in a readback signal of the subject servo reader are identified and the energies of the identified PN sequences are evaluated. Again, where a data reader for reading data and a data writer for writing data are mechanically coupled with the subject servo reader, any lateral deviation of the subject servo reader detected by reading the second servo subband also is valid for the data reader and the data writer. Hence, any lateral actuation of the tape head including the subject servo reader, the data reader and the data writer may correct for the detected deviation and bring the data reader and the data writer back on their desired lateral positions.

Whenever the a length of the pseudo noise sequence—when all pseudo noise sequences used in the different servo tracks have the same length—is less than the length of the servo frame in the first subband, the second servo subband may allow determination of lateral position values—denoted as second lateral position values—at a frequency higher than the repetition frequency, and as such update the lateral position of the tape head at a second frequency higher than the repetition frequency of the servo frames in the first subband. In some embodiments, a ratio of the second frequency and the repetition frequency may exceed ten.

Irrespective of the type of waveforms used for the second subband, the second subband preferably is reserved for additional servo patterns aiming at fast and granular acquisition of lateral position information. These servo patterns preferably have an inherent high density in magnetic transitions—this is why these servo patterns here also are referred to as high density patterns—in order to enable more frequent and subject to the granularity of the servo tracks in the second subband more accurate estimates of servo channel parameters such as the lateral position, thereby enabling improved tape head positioning at a much wider tape velocity range and supporting for larger bandwidth head actuation.

Summarizing, a hybrid servo pattern scheme is provided with two distinct servo pattern approaches, arranged in at least two different adjacent servo subbands of a servo band.

Although the servo patterns in the second servo subband may allow for a higher update rate than the frame servo pattern in the first servo subband, it still is envisaged to maintain the frame servo pattern in addition to the servo patterns in the second subband for the following reasons: In one embodiment, the frame servo pattern in the first servo band is used for initial lateral position acquisition and positioning of the tape head, and/or for and the acquisition of other servo channel parameters such as tape velocity or head-to-tape skew. The frame servo pattern may also be used for encoding additional information such as a servo band identifier, longitudinal tape position (LPOS) or manufacturing information. Using this kind of servo information from the first subband, a special servo frame or burst structure is not required for the servo patterns in the second subband, thus enabling a significantly improved parameter update rate.

Embodiments of the present invention may enable an increase in data track density envisaged for future tape drives, given that the lateral position of the tape head and potentially its skew with respect to the tape can be determined at a finer scale and faster compared to conventional tape storage systems. Since the known TBS servo pattern is combined with a high density servo pattern the lateral tape position of the tape head with respect to the tape storage medium may be sufficiently accurate to ensure adequate positioning accuracy of the data readers and data writers that move along data tracks. Furthermore, a repetition rate of the head lateral position estimates may now be sufficiently high to guarantee proper track following operation even at a very low tape velocity. In addition, actuators of future tape heads with large bandwidths are supported. Hence, the presently introduced new servo format for tape storage media targets i.e., BaFe tape media, with 4 or 8 data bands, and with 32 or 64 parallel data channels, as possible applications. Hence, a deviation in the position error signal (PES) is minimized, thus enabling (data) track density scaling for tape capacities of up to hundreds of terabytes. In addition, data rate scaling with host computer requirements through the support of a wider velocity range may be improved. Furthermore, the high density pattern may also be utilized to generate a reference periodic signal (pilot signal) for aiding the timing recovery process for data detection in the data channels.

Servo patterns of the present kind may be written during tape manufacturing, or may be written during operation of the tape storage medium in a tape drive. A write head for writing in particular the servo patterns into the second servo subband is preferred to enable writing the different servo patterns to the different servo tracks at the same time, i.e. the servo patterns are written to the multiple adjacent servo tracks off the reel, i.e. the tape is required to pass the write head only once for writing the desired servo patterns. In one embodiment, continuous writing is applied for writing the servo patterns to the tape. In continuous writing, which is also denoted as trailing-edge writing, the write head continuously writes without interruption, i.e. a current applied to the write head is continuously switched between positive and negative current values. This enables writing features that are much smaller than when using pulsed writing, in which the current is switched on and off while moving the tape by the write head.

According to another aspect of the invention, a tape drive is provided comprising a tape head. The tape head contains at least a first servo reader assigned for reading from the servo band, and a second servo reader assigned for reading from the servo band. While in operation of the tape drive, one servo reader of the set of servo readers assigned for reading servo information from a common servo band may read from the first servo subband while another servo reader of the set of servo readers simultaneously reads from the second subband. However, the assignment of the servo readers to the different subbands may change, for example, dependent on the motion direction of the tape storage medium. For example, the assignment of the servo readers in a forward tape motion direction may be different than in the reverse tape motion direction. In case of more than two servo readers assigned to a common servo band, one or more of the readers may even be in an idle mode in some operating scenarios such as in one of the tape motion directions, etc.

In an embodiment of operation, the first and the second servo subbands are read simultaneously, and the two readback signals with the information read are analyzed simultaneously. Given that both servo readers inherently provide lateral position information, it is preferred that the adjustment of the lateral position of the tape head is achieved whenever a new lateral position value is determined from whichever servo channel, be it the servo channel processing the signal from the first servo reader, or the servo channel processing the signal from the second servo reader. Hence a controller for the tape head actuator may be designed which derives a control signal for the tape head actuator by means of a weighted selection and or a weighted combining of the first lateral position value and the second lateral position value.

FIG. 1 provides an illustration of a section of a servo band SB contributing to a tape storage medium TP together with data bands and possibly further servo bands. The servo band SB extends along a longitudinal axis x which at the same time represents the direction into which the tape storage medium TP extends, and along which the tape storage medium TP is moved during operation, i.e. the tape moving direction TMD. The servo band contains two subbands SB1 and SB2, wherein the first and the second subband SB1 and SB2 are arranged next to each other and contain fundamentally different servo patterns. Preferably, the servo band SB extends all along the longitudinal extension of the tape storage medium TP such that the shown servo patterns represent only a very small cut whereas in practice the shown servo patterns are repeated for several thousand times along the tape storage medium TP in each servo band SB.

Figure 2:
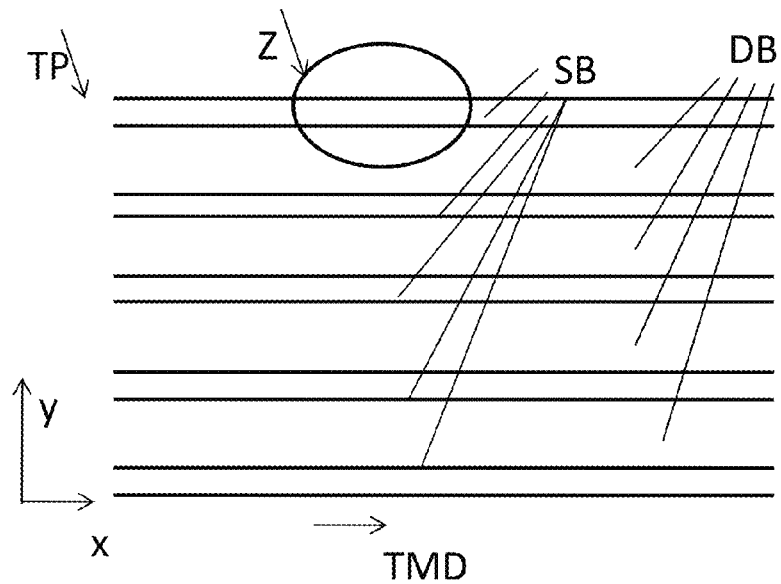
FIG. 2 illustrates a portion of tape storage medium according to an embodiment of the present invention.

For illustrating a sample servo band/data band structure on a tape storage medium it is referred to FIG. 2. In this schematic top view on a section of a tape storage medium TP, the tape storage medium TP has a longitudinal extension in x direction and a lateral extension in y direction. The longitudinal extension in x direction is parallel to a tape motion direction TMD, assuming there is no tape skew. Servo bands SB and data bands DB extend along the longitudinal extension of the tape storage medium TP. Each data band DB is arranged in between two servo bands SB. Each data band DB contains multiple data tracks not shown in detail, wherein preferably multiple of these data tracks of a data band DB are written and/or read simultaneously in case a tape head of the tape drive provides multiple write and/or read elements. Each servo band SB contains servo patterns arranged along the longitudinal extension of the tape storage medium TP, such as shown in FIG. 1. In particular, a cutout Z of the top most servo band SB may be illustrated in FIG. 1.

Returning to FIG. 1, in the first subband SB1, a timing based servo pattern is arranged, also denoted as frame servo pattern including a sample servo pattern in a servo frame FR containing two servo sub-frames SFR1 and SFR2, according to an embodiment of the present invention. In the present example, the servo frame FR comprises eighteen servo stripes SP1 and SP2 organized in four bursts A, B, C and D of five or four stripes SP1, SP2. Each stripe SP1 is oriented at an azimuthal angle $\alpha$ with respect to the lateral extension of the tape 1 in y-direction, and each stripe SP2 is oriented at an azimuthal angle $\beta$ with respect to the lateral extension of the tape 1 in y-direction in the present example of either $\alpha=+6°$ or $\beta=-\alpha=-6°$. However, other configurations may be used, for example, with variations in the servo pattern height or other geometric dimensions, in the number of bursts, or in the number of servo stripes per burst.

Hence, a burst may be interpreted as a set of stripes parallel to each other. In a first one of the at least two bursts the at least two servo stripes are inclined at a first angle with respect to a direction orthogonal to the longitudinal extension of the tape medium, which angle is also referred to as azimuthal angle. The first burst is followed by a second burst in which second burst the at least two servo stripes are inclined at a second angle with respect to a direction orthogonal to the longitudinal extension of the tape, which second angle is different from the first angle. This means, that the stripes of neighboring bursts are not parallel to each other. In an embodiment, the first angle is $+\alpha$ while the second angle is $\beta=-\alpha$ with respect to the lateral axis. In such arrangement of stripes within consecutive bursts, an interval between pulses generated by an assigned servo reader when scanning the first and the second burst indicates a lateral position of the servo reader, and as such a deviation of the servo reader from its reference position, and as such a deviation of the position of the tape head relative to the tape media. For example, in case the lateral reference position is in the middle of the servo band and the servo head is offset from such middle position, a distance between a stripe of the first burst to a stripe of the second burst in a lateral offset situation is different than a corresponding distance when the servo reader matches the reference position in the middle of the servo band due to the stripes inclined at different angles in the two bursts. A different distance is reflected in a varied timing of pulses supplied by the servo reader when scanning across the first and second servo burst. Hence, a timing based evaluation of the position error signal supplied in form of pulses by the assigned servo reader is performed.

While reading and/or writing data from and/or to the tape, the tape moves relative to a tape head in the longitudinal direction x. In addition, the tape head preferably is movable in the lateral direction y, i.e., transverse to the direction x, by means of a suitable actuator. However, due to a lateral offset of the tape with respect to the tape head, a misalignment of both may occur. For realigning the tape with the tape head, the position of the tape head relative to the tape is estimated from a relative timing of pulses (a.k.a. dibits) as is indicated above generated by a servo reader, also denoted as first servo reader SR1 in the following, reading the servo stripes/patterns from the first subband SB1 during tape drive operation. In particular, a servo channel processing TBS servo signals can estimate a tape velocity by measuring a time difference between pairs of stripes SP1 or SP2 with identical azimuthal angle, e.g. between A- and C-burst stripes/pulses and/or B- and D-bursts stripes/pulses. By comparing the relative timing of pulses generated by pairs of stripes SP1 and SP2 with opposite azimuthal angles, e.g. between A- and B-burst stripes and C- and D-bursts stripes, combined with the above velocity estimate, the servo channel can further estimate the lateral position of the tape head the first servo reader is mechanically coupled to. When a deviation between the tape head and the tape is determined, a control unit may, in a closed-loop control, control the actuator of the tape head and laterally reposition the tape head such that the tape head is laterally realigned with the tape. However, given that a new lateral position value can only be determined once an entire frame or subframe is read, a rate of such parameter update is limited by the length of the servo frames together with the tape velocity determining the rate for the updates.

Generally, additional information may be encoded in the servo frames of the servo band. For example, such additional information may be encoded into code words of length g by using an M-ary alphabet of symbols with M>1. Given that a number of g symbols contribute to the code word, in one embodiment g servo frames may be used for representing a code word wherein each servo frame contains a symbol of such code word. Specifically, the alphabet A may be a binary alphabet with symbols "0" and "1". In each consecutive servo frame a single symbol may be encoded, i.e. either a "0" or a "1". However, a sequence of symbols may also be encoded in consecutive servo frames with added redundancy to allow for error correction.

In another embodiment of the present invention, additional information may be encoded into the servo patterns. Specifically, a single symbol of an M-ary alphabet may be encoded per servo frame. Therefore for encoding a word containing x digits, x servo frames may be used. Within a servo frame, the symbol may be encoded redundantly in more than one servo burst, or may not be encoded redundantly on a servo burst basis such that only a single burst holds the encoded information. Within a servo burst, and provided that a servo burst holds a sub-pattern in form of a set of parallel stripes, only a subset of the set of stripes may be used for encoding a symbol. Specifically, the additional information may be information as to a presently scanned longitudinal position of the tape. Such longitudinal position information, also denoted as LPOS, may in one embodiment be encoded in the servo patterns. Hence, the longitudinal position of the tape may be identified based on the LPOS information read by the servo reader. The LPOS information may be used for winding the tape media to a given longitudinal position and, for example, starting reading and/or writing at such specified longitudinal position. Other information such as manufacturing information may be added too, which, for example, may indicate the manufacturer of the tape cartridge, the date of manufacturing the tape cartridge, information as to the standard the present cartridge may conform to, etc. In one embodiment, the additional information may be encoded by an offset of certain stripes in a burst, such as the second and fourth stripe in the A- and B-burst of the example of FIG. 1. In another embodiment, polarity modulation of stripes may be used as means of encoding the additional information. I.e., one or more stripes may be written at different polarity by that encoding the additional information.

The second servo band SB2 is organized in multiple parallel servo tracks STx. In the present embodiment, six adjacent servo tracks ST1 to ST6 are provided, however, any number of servo tracks, greater than one, may be provided subject to the sensitivity in lateral position sensing to be achieved, subject to a width provided for the second subband SB2, and subject to a width wSR2 of an assigned servo reader also denoted as second servo reader SR2. It is assumed that each servo track STx is of the same width wST in lateral dimension y, i.e. orthogonal to the longitudinal extension of the tape storage medium TP. Each servo track STx contains a dedicated servo pattern. The servo pattern in a servo track of second servo subband SB2 may preferably be characterized by being a continuous servo pattern extending all along the servo band and consequently all along the tape storage medium TP, and be characterized by being a frameless servo pattern such that lateral position information may be derived from the servo pattern continuously while reading with the second servo reader SR2 without the need to wait for the completion of reading an entire servo frame FR or subframe SFR from the first subband SB1.

Preferably, the storage patterns at least of adjacent servo tracks differ from each other such that they are orthogonal as previously described.

In the embodiment as is shown in FIG. 1, the servo pattern in each servo track STx may contain magnetic transitions at different frequencies. In the present example, the magnetic transitions are provided with three different frequencies f1, f2 or f3 wherein each transition from a white to a black region or vice versa denotes a magnetic transition. In the present example, the frequencies f1>f2>f3 and every two adjacent servo tracks STx contain a servo pattern of magnetic transitions of different frequency fx. Moreover, the same servo pattern is applied to every third servo track, such that the servo tracks ST1 and ST4 contain the identical servo pattern. So do the servo tracks ST2 and ST5, and ST3 and ST6 respectively. Hence, triplets of servo tracks STx are identical to each other. In a preferred embodiment, it is preferred that the set of servo tracks is organized into triplets of identical servo tracks wherein in each triplet periodic waveforms with three different frequencies are used.

The second servo reader SR2 assigned to presently read the second subband SB2 of the tape storage medium TP has the width wSR2 of at least the width of each servo track STx, i.e. wSR2 is equal or greater than wST, and in case of servo tracks of different width of at least the width of the servo track with the smallest width. The width wSR2 of the second servo reader SR2 reflects its extension into lateral direction, i.e. orthogonal to the longitudinal extension of the tape storage medium TP. Preferably, the width wSR2 of the second servo reader SR2 is more than the width wST of each servo track STx such as is shown in the embodiment of FIG. 1.

In the present example, in addition to the second servo reader SR2, a first servo reader SR1 is provided for presently reading the frame servo pattern in the first subband SB1. As can be derived from FIG. 1, the first and the second servo readers SR1 and SR2 are individual servo readers spaced apart from each other and providing individual sensor signals. However, it is assumed that the first and the second servo reader SR1 and SR2 are mechanically coupled in a tape head at a fixed distance such that any change of a position of the first servo reader SR1 relative to the tape storage medium TP applies to the second servo reader SR2, too. In the present embodiment, a width wSR1 of the first servo reader SR1 is equal to the width wSR2 of the second servo reader SR2. In other embodiments, these widths wSR1 and wSR2 may be different.

While moving the tape storage medium TP across the tape head including the second servo reader SR2 in tape motion direction TMD, the second servo reader SR2 provides a sensor signal, also denoted as readback signal, containing at least components of two of the three frequencies f1, f2, f3 in view of the width wSR2 of the second servo reader SR2 exceeding the width wST of the servo tracks STx. Subject to the lateral position of the second servo reader SR2, energies of the two or three frequency components in the readback signal vary. From the identified presence and the energies, a lateral position value of the second servo reader SR2 with respect to the tape storage medium TP can be derived.

Figure 3:
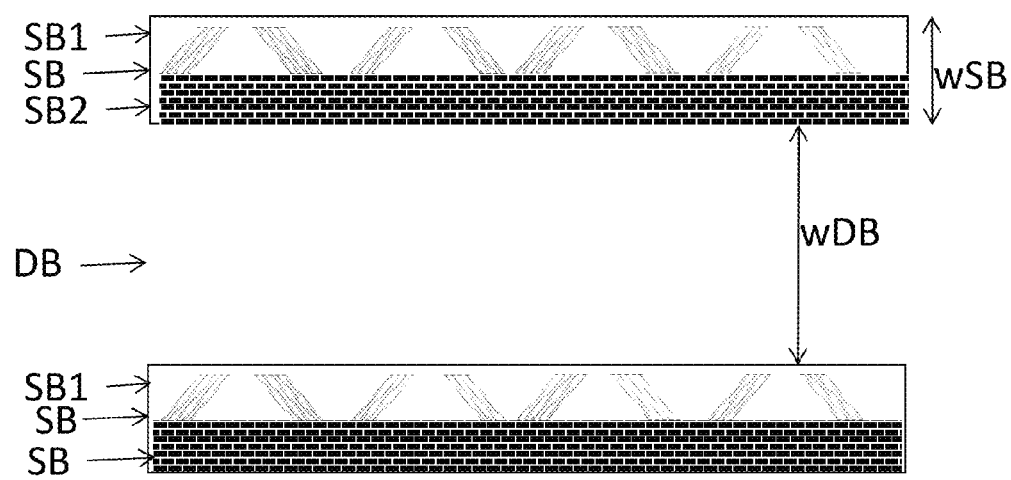
FIG. 3 illustrates a portion of a tape storage medium according to an embodiment of the present invention.

FIG. 3 illustrates a section of a tape storage medium with a data band DB in between two servo bands SB. Each servo band SB includes a first servo subband SB1 containing the TBS frame servo pattern. In the present example, the first subband SB1 claims half a width wSB of the servo band SB such that the second servo subband SB2 may claim the other half of the width wSB of the servo band SB, which is indicated by the brick like pattern. In general, in current tape storage systems the requirement for higher data rates can be achieved by increasing the number of data tracks to be written and read in a single pass, provided the tape head is assigned a corresponding number of adjacent readers and/or writer for reading and/or writing these multiple data tracks of the data band DB in a single pass. For instance, in case the number of parallel data channels is increased from 16 to 32, the achievable data rate essentially is doubled. The doubling of the number of channels results in writing or reading twice the amount of data at a time, thereby reducing the number of required servo locations and associated head lateral positions by a factor of two, provided a sensitivity of the lateral position sensing/servo mechanism remains the same as with the previous number of data tracks and data channels respectively. The width of a previous frame servo pattern can as a result be reduced by a factor of two, such as shown in FIG. 3. The reduced width of the frame servo pattern results in an unused space in the servo band SB, provided the width wSB of the servo band SB remains the same as previously defined, i.e. as defined for previous generations. However, it is preferred that the overall width of the tape storage medium TP remains the same across generations as does the width wSB of each servo band SB and the width wDB of each data band DB, given that new tape drive system generations with an increased number of data channels still may be required to be backward compatible with older generations, meaning that tape storage mediums of older tape storage system generations should still be readable and/or writable, which results in the widths of the servo bands and data bands not be changed across generations. Consequently, the otherwise unused space in a new generation may now be claimed for a different servo pattern such as the one proposed, and represent a second subband next to the first subband SB1 containing the frame servo pattern.

Figure 4:
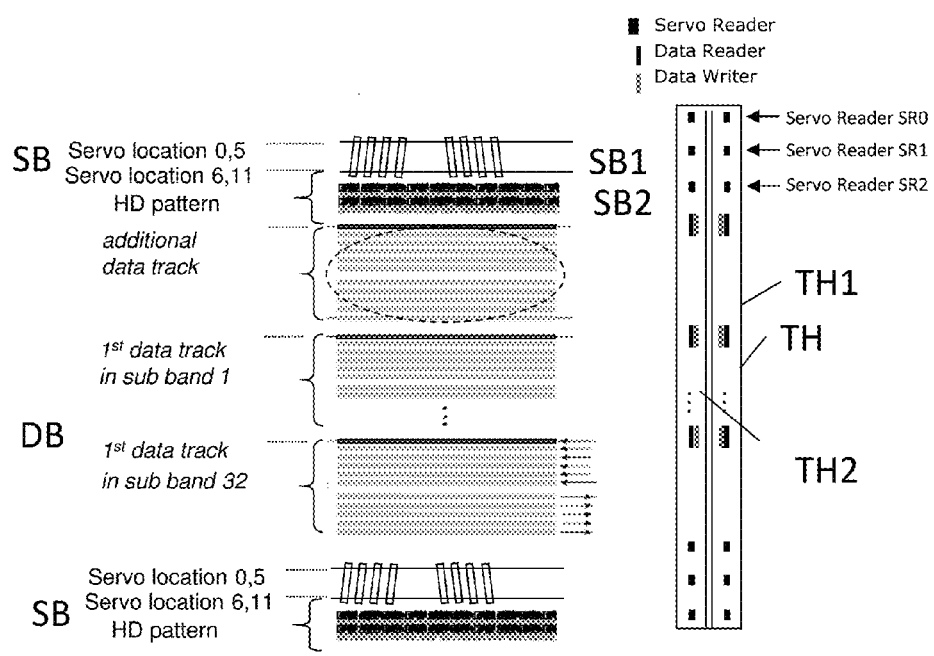
FIG. 4 illustrates selected items of a tape drive according to another embodiment of the present invention.

FIG. 4 schematically shows a tape drive including a tape head TH with two tape head modules TH1 and TH2 positioned relative to a schematic sketch of a tape storage medium TP with two servo bands SB. Each servo band SB comprises a first servo subband SB1 containing the frame servo patterns and a second servo subband SB2 containing a high density servo pattern. Below the first servo band SB is a data band DB containing various data subbands as well as an additional data track area. Presently, a data band contains twelve wraps. The tape head modules TH1 and TH2 are identical to each other and allow for read after writing data for monitoring purposes.

The tape head contains three servo readers SR0, SR1, and SR2 assigned to each servo band SB. While the tape is moved in a forward direction relative to the tape head, the servo reader SR1 is used for reading the frame servo pattern in the first subband SB1 at a reference location denoted by "servo locations 0 through 5", and the servo reader SR2 reads the high density servo patterns in the second subband SB2. The servo reader SR0 is not used while the tape is moving in the forward direction.

While the tape is moved in a backward direction relative to the tape head, the servo reader SR0 is used for reading the frame servo pattern in the first subband SB1 at a reference location denoted by "servo locations 6 through 11", and the servo reader SR1 is used to read the high density servo patterns in the second subband SB2. The servo reader SR2 is not used while the tape moving in the backward direction.

In this example, the width of each servo band SB is reduced to half of the width of the servo bands as used in the examples of FIG. 1 or FIG. 3, for example, and in a specific embodiment to ~93/2 μm. This allows for either a higher update rate, or an increased azimuth angle at constant update rate compared to the previous widths of each servo band SB which in a specific embodiment was 93 μm. Hence, the servo patterns in the second subband SB2 can be introduced without any penalty in cartridge capacity. Instead, the area denoted as "additional data track" is freed for additional data compared to previous generations. A method for halving the servo band width, while maintaining the same number of wraps in data bands, relies on increasing from one to at least two the number of servo readers used for reading a reduced servo band. Any additional servo reader placed adjacent to the "original" servo readers, and spaced a distance approximately equal to the width of the reduced servo band. In the proposed embodiment, a third servo reader SR2 is included in each tape head module, so that two out of three servo readers are always active to read both the first and the second servo subbands SB1 and SB2.

Figure 5A:
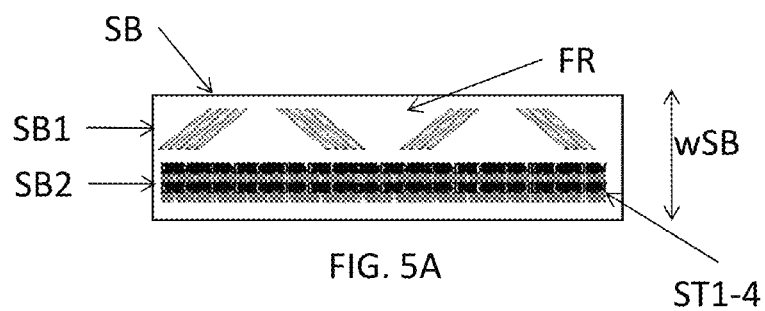
FIGS. 5A-E illustrate a portion of a servo band of a tape storage medium and graphs according to an embodiment of the present invention, and related diagrams.
Figure 5B:
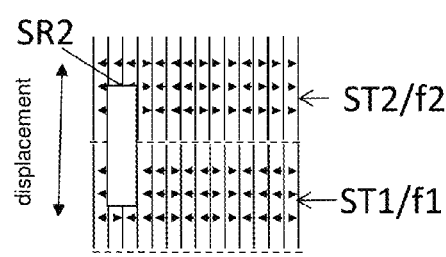

FIG. 5A illustrates a diagram of a section of a servo band SB according to an embodiment of the present invention. Again, the first subband SB1 contains the TBS servo pattern while the second servo subband SB2 contains multiple high density servo patterns arranged in several servo tracks ST1 to ST4 parallel to each other which four servo tracks ST1 to ST4 are only exemplary for illustration purposes. In this embodiment, the high density patterns are represented by multi-frequency patterns also denoted as multi-tone patterns. In particular, periodic sequences of magnetic transitions with negligible overlapping of spectral content are used in adjacent servo track ST1 to ST4 with negligible overlapping of spectral content. For example, as is shown with respect to the diagram of FIG. 5B which is a cutout of the second servo band SB2 of the diagram of FIG. 5A, a high-frequency waveform is used in servo track ST1 having 100 periods within 76 μm representing the length of a subframe of the frame servo pattern, which results in a period of 0.76 μm. In servo track ST2, a low-frequency waveform is used having 50 periods within 76 μm representing the length of a subframe of the frame servo pattern, which results in a period of 1.52 μm. The arrows in the diagram of FIG. 5B do not match any frequency relations described but only reflect magnetic transitions in general. The waveform used in servo track ST3 is identical to the one of servo track ST1, and the waveform used in servo track ST4 is identical to the one of servo track ST2. Hence, servo tracks ST1 and ST3 contain the same servo pattern, and servo tracks ST2 and ST4 contain the same servo pattern, however, the servo patterns in adjacent servo tracks ST1 to ST4 are different for every two adjacent servo tracks. A second servo reader SR2 is shown in the diagram of FIG. 5B with a width corresponding to the width of the servo tracks STx.

Figure 5C:
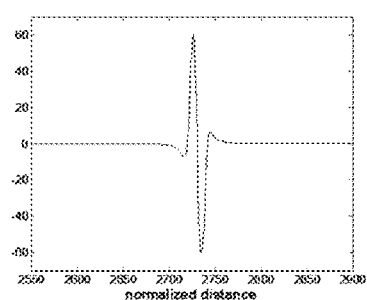
Figure 5D:
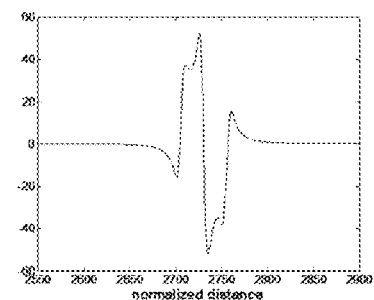
Figure 5E:
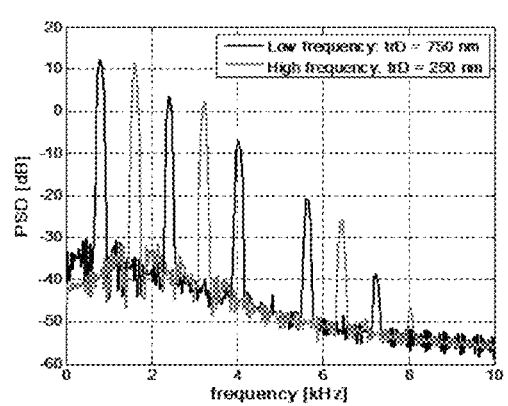

For illustration purposes, in the diagram of FIG. 5C, a waveform is shown in the time domain for the second servo reader SR2 exclusively covering the first servo track ST1 without any overlap into the second servo track ST2, and only a single period comprising two magnetic transitions is provided with a magnetically erased area next to the left and to the right of the two magnetic transitions in the first servo track ST1. In the diagram of FIG. 5D a waveform is shown in the time domain for the second servo reader SR2 exclusively covering the second servo track ST2 without any overlap into the first servo track ST1, and only a single period comprising two magnetic transitions is provided with an magnetically erased area next to the left and to the right of the two magnetic transitions in the second servo track ST2. In the diagram of FIG. 5E, a frequency spectrum is shown of a readback signal of the second servo reader SR2 being positioned according to the diagram of FIG. 5B and covering the first and the second servo track ST1 and ST2 to the same extent. From such frequency representation it can be derived that both frequencies f1 and f2 appear with the same energy given that the second servo reader SR2 overlaps both servo tracks ST1 and ST2 to the same extent. The diagram of FIG. 5E further shows additional double frequency peaks representing harmonic frequencies resulting from the magnetic transitions. In any case, the frequency spectrum of the adjacent servo patterns is chosen such that the two patterns can be discriminated and only negligibly interfere. In the present example, the tape is assumed to be moved at a speed of 5.1 m/s.

Hence, in general a second servo reader provides a readback signal that can be detected by a discrete Fourier transform based detector for periodic waveforms to determine a second lateral position value next to the first lateral position value originating from the frame servo pattern in the first servo subband. The servo patterns in the second subband may also be used to generate a pilot signal supporting a timing recovery process of data in the data tracks. A second servo reader position relative to an edge between adjacent servo patterns of adjacent servo tracks in the second servo subband can be derived from the readback signal of the second servo reader that is provided to a detector that detects and discriminates an energy contained in the different servo patterns sensed by the second servo reader. Ambiguity between repeating servo patterns, e.g. in the case of only x different servo patterns used in a number of servo tracks greater than x may be avoided by determining a coarse tape head positioning by the readback signal of the first servo reader reading the frame servo pattern.

In contrast, FIG. 6 shows another example of a second subband SB2 containing three servo tracks ST1 to ST3 with each of the servo tracks ST1 to ST3 containing a servo pattern of magnetic transitions at a different frequency f1, f2 and f3. In the present example, the first servo track ST1 contains a servo pattern at a first frequency f1, the second servo track ST2 contains a second servo pattern at a second frequency f2, and the third servo track ST3 contains a servo pattern at a third frequency f3, wherein f3 is greater than f2 and f2 is greater than f1. Again, a second servo reader SR2 is provided with a width corresponding to the width of each servo track STx. Hence, an edge between the second servo track ST2 and the first servo track ST1, as is represented by a lateral position of the second servo reader SR2 as shown in diagram 6A, can be discriminated from an edge of the second servo track ST2 and the third servo track ST3, as is represented by the lateral position of the second servo reader SR2 as shown in diagram 6C, by means of identifying the various frequencies in the readback signal and evaluating their energies as is shown in the diagrams 6B and 6D respectively. In the scenario of diagram 6A, in addition to the second frequency f2, the first, lower frequency f1 is present in the readback signal of the second servo reader SR2 and can be detected by a spectral analysis. The energies of the spectral components f1 and f2 represent the relation of the second servo reader SR2 overlapping the first and the second servo tracks ST1 and ST2. Given that the energy of the spectral component of frequency f1 is smaller than the energy of the spectral component of the second frequency f2, it follows that the second servo reader SR2 covers the second servo track ST2 more than the first servo track ST1. From a ratio of the corresponding energies a fine position of the second servo reader SR2 with respect to the tape can be derived. In the scenario of diagram 6B, in addition to the second frequency f2, the third, higher frequency f3 is present in the readback signal of the second servo reader SR2 and can be detected by a spectral analysis. The energies of the spectral components f2 and f3 again represent the relation of the second servo reader SR2 overlapping the second and the third servo tracks ST2 and ST3. Given that the energy of the spectral component of the third frequency f3 is smaller than the energy of the spectral component of the second frequency f2, it follows that the second servo reader SR2 covers the second servo track ST2 more than the third servo track ST3. From the ratio of the corresponding energies a fine position of the second servo reader SR2 with respect to the tape can be derived.

Hence, in general the provision of a different servo pattern per servo track can avoid ambiguity in the computation of the position error signal in contrast to the provision of identical servo patterns in different tracks, even if not in adjacent ones.

FIG. 7A illustrates a diagram of a section of a servo band SB according to another embodiment of the present invention. Again, the first subband SB1 contains the TBS servo pattern while the second servo subband SB2 contains multiple high density servo patterns arranged in several servo tracks ST1 to ST4 parallel to each other which four servo tracks ST1 to ST4 are only exemplary for illustration purposes. In this embodiment, the high density patterns are represented by pseudo noise sequences. In particular, magnetic transitions representing pseudo noise patterns with good cross correlation properties are used in adjacent servo tracks ST1 to ST4. For example, as is shown with respect to the diagram of FIG. 7B, which is a cutout of the second servo band SB2 of the diagram of FIG. 7A, a first pseudo noise sequence PN_A is used in servo track ST1, and a second pseudo noise sequence PN_B is used in the second servo track ST2. For example, the pseudo noise sequences PN_A and PN_B each represent a pseudo noise sequence of length 31, i.e. comprising 31 binary symbols, with good cross-correlation properties. In the present embodiment, each pseudo noise sequence PN_A and PN_B extends over 76 μm, which preferably may be less than the length of a servo frame in the first subband. The above pseudo noise sequence length yields a binary symbol length of 2.45 μm. For example, for a tape velocity of 5.1 m/s, the PN sequence repetition interval is equal to 14.9 μs. The sequence used in servo track ST3 is identical to the one of servo track ST1, and the sequence used in servo track ST4 is identical to the one of servo track ST2. Hence, servo tracks ST1 and ST3 contain the same pseudo noise sequence PN_A, and servo tracks ST2 and ST4 contain the same pseudo noise sequence PN_B, however, the servo patterns in adjacent servo tracks are different for every two adjacent servo tracks. A second servo reader SR2 is shown in the diagram of FIG. 7B with a width corresponding to the width of the servo tracks STx.

A readback signal of the second servo reader SR2 preferably is filtered by two or more correlators, thus providing sufficient information to determine a fine position of the second servo reader SR2 and thus, the tape head. In the diagram of FIG. 7C, an associate sample readback signal of the second servo reader SR2 is shown in the time domain for a lateral position of the second servo reader SR2 as shown in the diagram of FIG. 7B. In the present embodiment, the energies of the signal components corresponding to the pseudo noise sequences PN_A and PN_B are provided by two different correlators given that two different pseudo noise sequences are used. In a first correlator, the readback signal is correlated in the time domain with the first pseudo noise sequence PN_A which provides a non zero auto correlation response in case of a component of the first pseudo noise sequence PN_A being present in the readback signal. In a second correlator, the readback signal is correlated with the second pseudo noise sequence PN_B which provides a non zero auto correlation response in case of a component of the second pseudo noise sequence PN_B being present in the readback signal. Given that waveforms of the two pseudo noise sequences are orthogonal to each other in the time domain, an energy of each component in the readback signal may be detected. In the the diagram of FIG. 7D the output signals of the two correlators are shown in the time domain. The components of the two pseudo noise sequences PN_A and PN_B used can thus be discriminated. They only negligibly interfere at the output of the correlators as the pseudo noise sequences are chosen to be orthogonal.

Hence, in general a second servo reader SP2 spanning at least two adjacent tracks ST1 to ST4 provides a readback signal that undergoes a correlation operation for identifying presence and/or energy of orthogonal waveforms possibly contained in the readback signal, from which a second lateral position value can be derived from. The servo patterns in the second subband SB2 may also be used to generate a pilot signal to support a timing recovery process of data in the data tracks. A second servo reader position relative to an edge between adjacent servo patterns of adjacent servo tracks in the second servo subband SB2 can be derived from the readback signal of the second servo reader SR2 spanning adjacent tracks, which readback signal is provided to a set of correlators that detect and evaluate the energy contained in the different pseudo noise sequences present in the readback signal of the second servo reader. Ambiguity between repeating servo patterns, e.g. in the case of only two different pseudo noise sequences used in a number of servo tracks greater than 2 may be avoided by determining a coarse tape head positioning by the readback signal of the first servo reader reading the frame servo pattern. Hence, in general the provision of a different servo pattern per servo track can avoid ambiguity in the computation of the position error signal in contrast to the provision of identical servo patterns in different tracks, even if not in adjacent ones.

Figure 8:
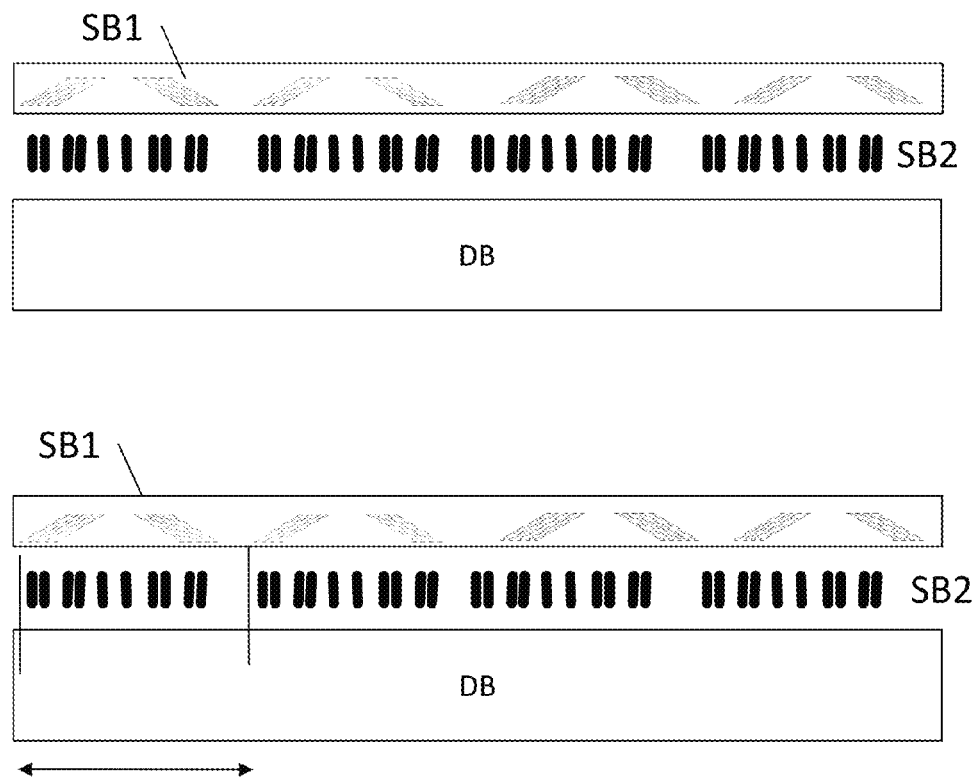
FIG. 8 illustrates a portion of a tape storage medium according to a further embodiment of the present invention.

FIG. 8 illustrates a section of a tape storage medium similar to the one of FIG. 3. Data bands DB are sandwiched in between servo bands SB. Each servo band SB includes a first servo subband SB1 containing the TBS frame servo pattern, and a second servo subband SB2 containing a high density servo patterns as only schematically represented by vertical stripes. A varying distance between the vertical stripes indicates that such high density servo pattern in the second subband SB2 may also contain additional information embedded such as LPOS information, servo band ID information, manufacturing information, etc. In a preferred embodiment, such additional information may now completely be encoded into the second servo subband SB2 such that the frame servo pattern in the first servo subband SB1 does not contain any such additional information. In this embodiment, the frame servo pattern may no longer provide more than two bursts per servo frame FR, such that bursts C and D of FIG. 1 may be removed given that these bursts C and D previously may be (co-)used for encoding additional information. Whenever additional bursts within a servo frame FR may become redundant and can be waived, the length of such servo frame FR shortens. In addition, a single burst may additionally be shortened in length by reducing the number of stripes per burst given that a higher number of stripes may only be preferred for the encoding of additional information.

In a very preferred embodiment, a servo frame FR of the frame servo pattern may then only contain two bursts A and B with only four stripes in each burst A and B. Any reduced length of a servo frame leads to an increased repetition frequency which may lead in turn to an increased rate of updates of the first lateral position values which supports a more accurate lateral positioning and hence enables higher data densities.

In another embodiment, additional information may be encoded in both, the TBS pattern in first subband SB1 and the high density pattern in the second subband.

Figure 9:
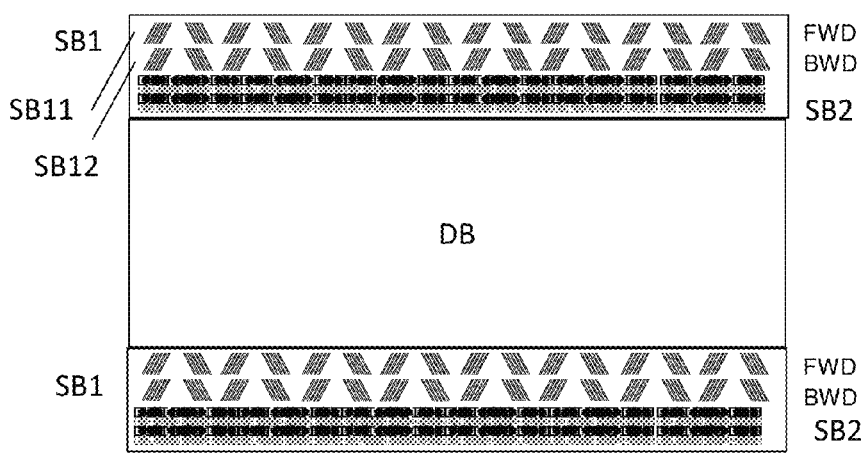
FIG. 9 illustrates a portion of a tape storage medium according to a further embodiment of the present invention.

FIG. 9 illustrates an embodiment, in which in comparison to the embodiment of FIG. 3 the first subband is further split into a first sub-subband SB11 and a second sub-subband SB12 while a width of the first subband SB1 remains the same when compared to a first subband SB1 containing a single frame servo pattern only. Each of the sub-subbands SB11 and SB12 contains its own frame servo pattern FWD and BWD as can be derived from FIG. 9. The second subband SB2 contains a high density servo pattern, e.g. any of the servo patterns introduced previously.

Given that in data bands DB of a tape storage medium, data tracks are written and read in a serpentine manner, adjacent data tracks contain data written linear in different directions, i.e. a forward motion direction of the tape and a backward motion direction of the tape. The two frame servo patterns FWB and BWD in the first and second sub-subbands SB11 now provide servo information for different motion directions of the tape. The frame servo pattern FWB in the first sub-subband SB11 is read by a servo reader when the tape is moved in a forward direction across the tape head while the frame servo pattern BWD in the second sub-subband SB12 is read by a servo reader when the tape is moved in a backward motion direction across the tape head, wherein the backward motion direction is the reverse direction of the forward motion direction. Hence, when reading or writing data tracks in the forward motion direction of the tape, lateral position information is derived from the first frame servo pattern FWD, and when reading or writing data tracks in the backward motion direction of the tape, lateral position information is derived from the second frame servo pattern BWD. As mentioned above, in this approach the width of each frame servo pattern FWD, BWD would be essentially half of the width of a single frame servo pattern used jointly for forward and backward motion direction of the tape. It is assumed that in such configuration a single first servo reader would be allocated for reading the first frame servo pattern FWD and the second frame servo pattern BWD.

In this configuration, a length of a servo frame within each of the first servo patterns FWD and BWD would be reduced compared to the length of a servo frame within a single frame servo pattern, for example as is used in connection with FIG. 3, given that only half of the width of the single frame servo pattern of FIG. 3 is used in each direction. A shorter frame length in turn leads to an increased repetition frequency of servo frames and to an increased update rate of first lateral position values, and in turn to a faster positioning of the tape head. In a preferred embodiment, tape motion direction information may be encoded into the frame servo patterns FWD and BWD for avoiding ambiguity between the two frame servo patterns FWD and BWD.

Figure 10:
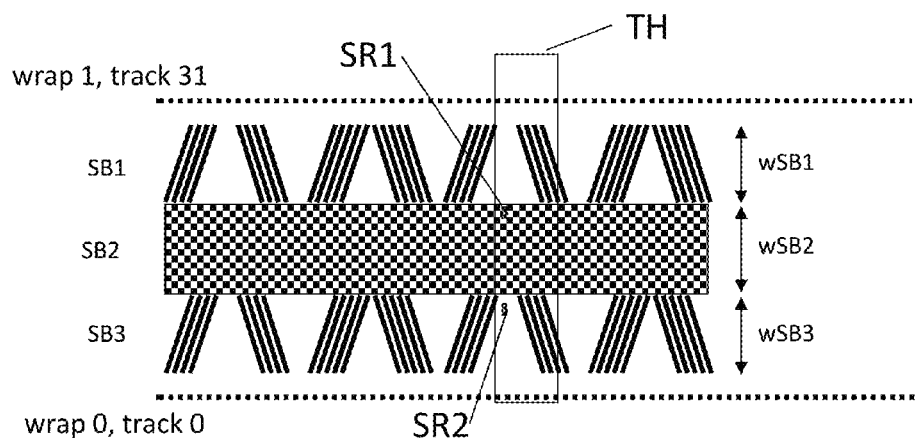
FIG. 10 illustrates selected items of a tape drive according to another embodiment of the present invention.

FIG. 10 shows a further embodiment, in which like in the embodiment of FIG. 9 two frame servo patterns are provided. However, in contrast to the embodiment of FIG. 9, the servo tracks of the second subband SB2 now are sandwiched between the two frame servo patterns. In the embodiment of FIG. 10, the two frame servo patterns and the servo tracks each cover the same width, for example wSB1 equals wSB2, which equals wSB3. In one embodiment, the total width of the servo band SB is 1.5 times the width of the servo band of FIG. 4, for example, hence claiming only half of the additional data track space below the servo band SB of FIG. 4. Hence, it is presently preferred to denote the area of the bottom frame servo pattern as third servo subband SB3.

In present FIG. 10, a tape head TH is schematically introduced which contains a first servo reader SR1 and a second servo reader SR2, in contrast to the configuration of FIG. 4, where three servo readers are included for reading servo information from the first and second servo subbands. The present servo band configuration has the advantage that it also serves for servoing in forward and backward motion direction of the tape across the tape head TH. While in the embodiment of FIG. 9, the same servo reader is assigned to the frame servo patterns in forward and backward motion direction and another servo reader is assigned for reading the servo patterns in the second servo subband SB2, in the present embodiment the first servo reader SR1 is assigned to the first subband SB1 and its frame servo pattern in the forward motion direction of the tape, while the second servo reader SR2 is assigned to the second subband SB2. However, the first servo reader SR1 is assigned to the second subband SB2 in the backward motion direction of the tape, while the second servo reader SR2 is assigned to the third subband SB3. Hence, the servo readers SR1 and SR2 read different types of servo patterns subject to the motion direction of the tape.

Figure 11:
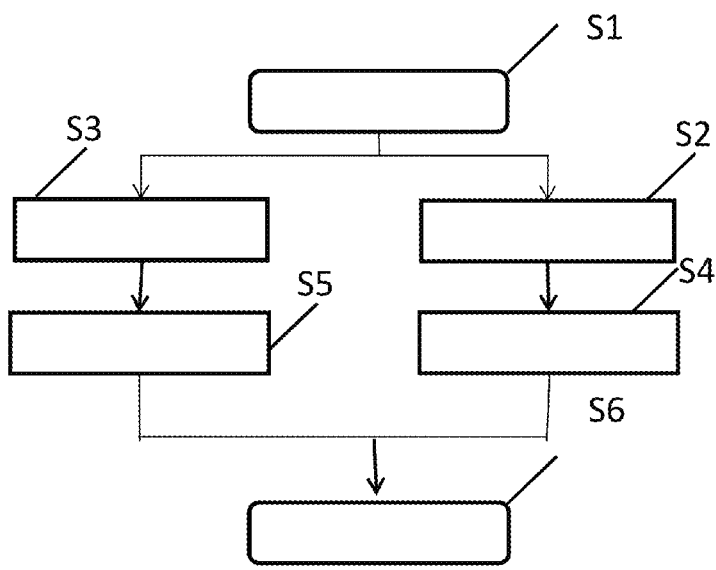
FIG. 11 illustrates a flowchart representing a method for operating a tape drive according to an embodiment of the present invention.

FIG. 11 shows a flow chart according to an embodiment of the present invention. In step S1, the method is started, for example, by activating the tape drive for reading and/or writing data to a tape storage medium in a tape cartridge inserted into the tape drive. It is assumed that the tape is already positioned at the desired longitudinal position. Then, while in step S1 the tape is already moved at a desired tape velocity, in steps S2 and S3 the servo information from the first servo subband (step S2) and the second servo subband (step S3) is read simultaneously. In step S4, the information from the first subband is analyzed, which may include a determination of the current tape velocity and a determination of a lateral position value derived from the frame servo pattern according to the description of FIG. 1. However, any such information may only be determined after a servo frame has passed the associate servo reader. In step S6, the first lateral position value determined in S4 may then be translated into a control signal for an actuator of the tape head for positioning the tape head laterally.

In step S5, the servo information read by the servo reader assigned to the second servo subband is analyzed and a second lateral position value is determined from the readback signal of the servo reader. Preferably, waveforms are identified in the readback signal and the second lateral position value is estimated based on the identified waveforms. This second lateral position value may again be translated into a signal for controlling the actuator of the tape head for positioning the tape head laterally in step S6. The rate of providing the second lateral position values is not limited to a frame to be first completely scanned before gaining information on the lateral position. Instead, the rate of the second lateral position values depends on a periodicity of the waveforms used and, of course, further depends on the tape velocity.

Hence, the first and the second lateral position value provided in steps S4 and S5 respectively are available at different rates. However, a control signal for the tape head actuator can be derived or updated in step S6 by means of a weighted selection and or a weighted combining of the first lateral position value and the second lateral position value whenever a new lateral position value available from S4 or S5.

FIG. 12 illustrates a block diagram of a tape drive according to an embodiment of the present invention. Two servo readers SR1 and SR2 provide their readback signals to a control unit CU. Specifically, the readback signal of the first servo reader SR1 reading the first servo subband containing the frame servo pattern is received by a timing based analysis TBA unit for converting time intervals between pulses generated by stripes in the frame servo pattern into a first lateral position value, which then is converted in a first position error signal in unit PES1. Simultaneously, a readback signal of the second servo reader SR2 reading the second servo subband containing multiple servo tracks is received by a spectral analyzer unit SA or a correlator unit CO subject to the underlying servo patterns in the individual servo tracks—multitone or pseudo noise—and a second lateral position value is determined. The second lateral position value is then converted into a second position error signal by a determination unit PES2. A tape head actuator controller AC unit translates the position error signals from units PES1 and PES2 into a control signal for the tape head actuator THA, which then adjusts the lateral position of the tape head to which the servo readers SR1 and SR2 are attached to.

Note that in all the considered embodiments the high density pattern may be utilized as a reference signal for aiding the timing recovery process for data detection in the data channels.

It will be understood by those skilled in the art that many modifications and permutations may be made without departing from the scope of the present invention.

As will be appreciated by one skilled in the art, aspects of the present invention may be embodied as a tape storage medium, a method for reading and/or writing data from and/or to a tape storage medium, or a computer program product. Accordingly, aspects of the present invention, in particular in form of the controller/control unit, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A tape storage medium comprising:
a tape storage medium comprising at least one servo band along a longitudinal extension of the tape storage medium, wherein the at least one servo band comprises positional information, and wherein the servo band further comprises:
a first servo subband extending along the longitudinal extension of the tape storage medium, the first servo subband comprising:
a first frame servo pattern containing a first set of servo frames, wherein each servo frame of the set comprises:
a first burst comprising at least one servo stripe inclined at a first angle with respect to a direction orthogonal to the longitudinal extension of the tape storage medium; and
a second burst comprising at least one servo stripe inclined at a second angle with respect to the direction orthogonal to the longitudinal extension of the tape storage medium, the second angle being different from the first angle;
a second servo subband extending along the longitudinal extension of the tape storage medium next to the first servo subband, the second servo subband comprising:
a set of servo tracks extending along the longitudinal extension of the tape storage medium and arranged next to each other;
wherein each servo track of the set contains a servo pattern representing a waveform when being read; and
wherein the waveforms of adjacent servo tracks are orthogonal to each other.

2. The tape storage medium according to claim 1, wherein the servo pattern of each servo track of the set contains magnetic transitions at a defined frequency; and
wherein the frequencies of magnetic transitions of servo patterns of adjacent servo tracks are different from each other.

3. The tape storage medium according to claim 2, wherein a lowest frequency of magnetic transitions in any of the servo tracks of the set is more than a repetition frequency of the servo frames in the first subband.

4. The tape storage medium of claim 2, wherein the lowest frequency is more than twice the repetition frequency of the servo frames in the first subband.

5. The tape storage medium of claim 2, wherein the lowest frequency is more than ten times the repetition frequency of the servo frames in the first subband.

6. Tape storage medium according to claim 1, wherein the servo pattern of each servo track of the set contains a pseudo noise sequence of symbols; and
wherein the pseudo noise sequences of servo patterns of adjacent servo tracks are different from each other.

7. The tape storage medium of claim 6, wherein a length of the pseudo noise sequence in the servo tracks is less than half the length of the servo frame in the first servo subband.

8. The tape storage medium according to claim 6, wherein a length of the pseudo noise sequence in the servo tracks is less than a length of the servo frame in the first servo subband.

9. Tape storage medium according to claim 1,
wherein the servo band comprises a third servo subband extending along the longitudinal extension of the tape storage medium comprising a second frame servo pattern containing a second set of servo frames.

10. The tape storage medium of claim 9,
wherein a length of the pseudo noise sequence in the servo tracks is less than a tenth of the length of the servo frame in the first servo subband.

11. The tape storage medium according to claim 9,
wherein the second frame servo pattern of the third servo subband is identical to the first frame servo pattern of the first servo subband; and
wherein the third servo subband is arranged next to the second servo subband.

12. The tape drive according to claim 1 further comprising:
a tape head, comprising:
    a first servo reader assigned for reading from the servo band; and
    a second servo reader assigned for reading from the servo band.

13. Tape drive according to claim 12,
wherein the first servo reader and the second servo reader are arranged adjacent to each other orthogonal to the longitudinal extension of the tape storage medium when arranged in the tape drive; and
wherein the first servo reader and the second servo reader are mechanically coupled at a fix distance from each other.

14. Tape drive according to claim 13,
wherein a width of the second servo reader orthogonal to the longitudinal extension of the tape storage medium when arranged in the tape drive is at least a width of a servo track in the second servo subband orthogonal to the longitudinal extension of the tape storage medium; and
wherein the width of the second servo reader is equal to the width of the first servo reader.

15. Tape drive according to claim 14,
wherein the tape head contains a third servo reader assigned for reading from the servo band and arranged adjacent to the second servo reader orthogonal to the longitudinal extension of the tape storage medium when arranged in the tape drive.

16. A method for operating a tape drive for a tape storage medium, comprising:
reading, by one or more processors, a first servo subband by a first servo reader;
determining, by one or more processors, a first lateral position value of a tape head comprising the first servo reader relative to a tape storage medium from a readback signal of the first servo reader and adjusting a lateral position of the tape head dependent on the first lateral position value;
reading, by one or more processors, a second servo subband by a second servo reader; and
determining, by one or more processors, a second lateral position value of the tape head comprising the second servo reader relative to the tape storage medium from a readback signal of the second servo reader and adjusting the lateral position of the tape head dependent on the second lateral position value.

17. Method according to claim 16,
wherein determining the second lateral position value comprises:
identifying, by one or more processors, one or more waveforms in the readback signal of the servo reader reading the second servo subband.

18. The method according to claim 16, further comprising:
reading, by one or more processors, a first servo subband and a second servo subband simultaneously;
determining, by one or more processors, the first lateral position value at a repetition frequency of a set of servo frames in the first servo subband; and
determining, by one or more processors, the second lateral position value at a second frequency exceeding the repetition frequency, and adjusting the lateral position of the tape head dependent on the first and second lateral position values.

19. A computer program product, the computer program product comprising:
a computer readable storage medium and program instructions stored on the computer readable storage medium, the program instructions comprising:
program instructions to read a first servo subband by a first servo reader;
program instructions to determine a first lateral position value of a tape head comprising the first servo reader relative to a tape storage medium from a readback signal of the first servo reader and adjusting a lateral position of the tape head dependent on the first lateral position value;
program instructions to read a second servo subband by a second servo reader; and
program instructions to determine a second lateral position value of the tape head comprising the second servo reader relative to the tape storage medium from a readback signal of the second servo reader and adjusting the lateral position of the tape head dependent on the second lateral position value.

20. The computer program product of claim 10, further comprising:
program instructions to read a first servo subband and a second servo subband simultaneously;
program instructions to determine the first lateral position value at a repetition frequency of a set of servo frames in the first servo subband;
program instructions to determine the second lateral position value at a second frequency exceeding the repetition frequency, and adjusting the lateral position of the tape head dependent on the first and second lateral position values; and
wherein program instructions to determine the second lateral position value comprises program instruction to identify one or more waveforms in the readback signal of the servo reader reading the second servo subband.

* * * * *